United States Patent [19]
Tan

[11] Patent Number: 6,062,577
[45] Date of Patent: May 16, 2000

[54] QUICK CLICK BRAKE AND SWIVEL SYSTEM

[76] Inventor: Stephen K Tan, 15827, E. Russell St., Whittier, Calif. 90603-2531

[21] Appl. No.: 09/129,652

[22] Filed: Aug. 5, 1998

[30]        Foreign Application Priority Data

Aug. 7, 1997 [CN] China ............................. 97 2 20214.5

[51] Int. Cl.⁷ ....................................................... B62B 7/00

[52] U.S. Cl. ................................... 280/47.38; 280/87.051

[58] Field of Search .............................. 280/47.38, 47.41, 280/87.051, 47.1, 642, 33.994; 188/31; 16/35 R

[56]          References Cited

U.S. PATENT DOCUMENTS 4,759,098  7/1988  Ko ................................................ 16/29
5,975,545  11/1999  Hu ......................................... 280/47.38

*Primary Examiner*—Lanna Mai
*Assistant Examiner*—Kevin McKinley
*Attorney, Agent, or Firm*—Akin, Gump, Strauss, Hauer & Feld, L.L.P.

[57]            ABSTRACT

An improved brake mechanism for wheels of baby carriages and strollers is integrated in a single unit and is adjustable between a universal or swivel state, a directional state, and a brake state. Transformation among the three states can be realized by a foot pedal. The brake mechanism includes a special V-shaped spring, a sliding collar that locks or unlocks the mechanism between the three states, as well as a colored indicator that is used to display the current state of the wheel.

7 Claims, 8 Drawing Sheets

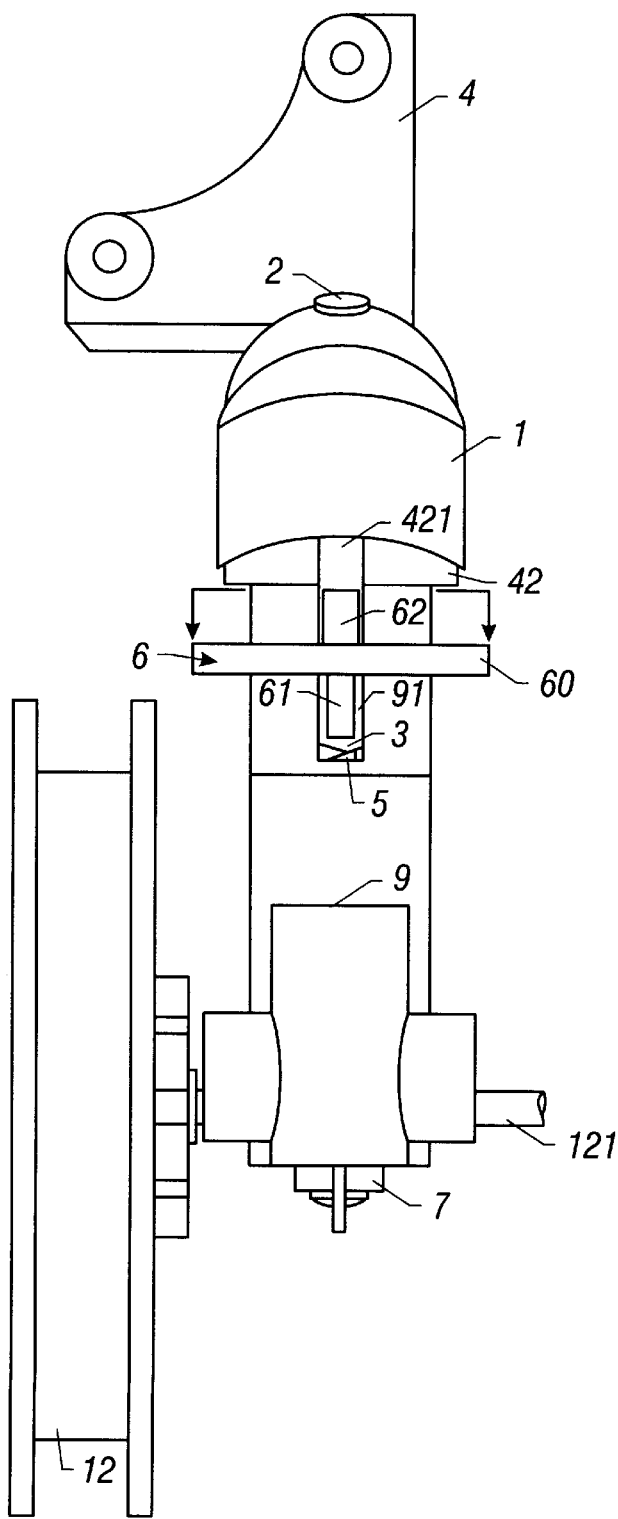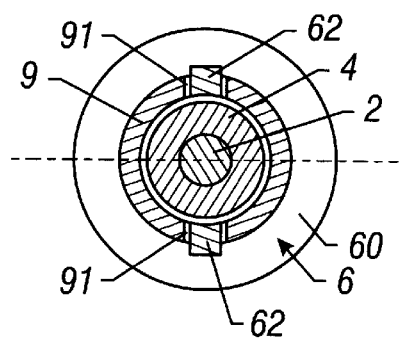
*FIG. 2A*
*FIG. 2*

QUICK CLICK BRAKE AND SWIVEL SYSTEM

FIELD OF THE INVENTION

The present invention relates to a brake mechanism for a baby carriage or stroller, and more particularly, to an improved device for baby carriage or stroller wheels that is integrated in a single unit and is adjustable between a swivel state, a directional state, and a brake state, i.e., a quick click brake & swivel system.

BACKGROUND OF THE INVENTION

Usually, there are some problems involved with operating carriages or strollers, such as unwanted movement of the carriage that cannot be controlled completely by any wheel of the carriage. In order to make a convenient brake, to avoid unwanted movement of the carriage, and to make the design of the carriage safer, the applicant of this invention has previously filed Chinese utility model patent application No. 96222862.1 in the Chinese patent office on Sep. 2, 1996, and entitled "Universal, Directional and Brake Mechanism Integrated in a Single Unit." According to this application, every wheel of the carriage can occupy three states, i.e. a universal or swivel state, a directional state and a directional-brake state. Transfer of the wheel between states can easily be accomplished by foot. The device shown in the above-identified application has been constructed to settle the above problems by making it easy to operate, quick to control, and safe to use. In many practices, however, the problems also found are:

First, the pedal arm is fixed together with the vertical shaft by molded plastic and therefore strength is required to step on the pedal, and usually the wheel must be turned to an optimum position which is suitable for stepping on;

Second, it's not very quick and convenient when the brake arm of the brake shoe sticks in the wheel rib when restoring the wheel to its former freewheeling state.

OBJECTS OF THE INVENTION

The present invention has been constructed to improve the above application, which discloses a more effective brake device with good features. The objective of the present invention is to provide an improved device for wheels that is integrated in a single unit and is adjustable between a swivel state, a directional state, and a brake state, and which is convenient and reliable.

SUMMARY OF THE INVENTION

Accordingly, an improved brake mechanism for one or more wheels of a baby carriage, stroller, or the like, according to the invention, is adjustable between at least a universal state and a directional state. The brake mechanism includes a mounting member adapted for connection to the carriage, stroller, or the like; a generally vertical shaft extending through the mounting member and adapted for rotation with respect to the mounting member; a wheel support member mounted for rotation about said shaft; and a collar mounted for sliding movement along the shaft between the mounting member and the wheel support member. The sliding collar is manually movable between at least a first collar position and a second collar position. The collar is operably engageable with the mounting member in the first collar position to define the universal state. The collar is also operably engageable and lockable with both the mounting member and wheel support member in the second collar position to define the directional state. In this manner, the brake mechanism is adjustable between the states by movement of the collar along the shaft independent of the position of the one or more wheels with respect to the mounting member.

According to a further embodiment of the invention, the collar is movable between the second collar position and a third collar position to define a brake state. The second collar position is preferably intermediate the first and third collar positions.

A brake controller is mounted for slidable movement along the shaft below the collar and is preferably biased toward the collar toward a first brake controller position. The brake controller is operably connected to the collar for movement between the first brake controller position and a second brake controller position as the collar is moved between the first and third collar positions. A V-shaped spring has a pair of outwardly biased legs connected to a central bight portion. The legs are preferably engageable with the brake controller to force the legs toward each other as the brake controller is moved toward one of the first and second brake controller positions. A locking rod is connected to at least one of the legs and is moveable therewith between an unlocked position when the legs are forced toward each other by movement of the brake controller toward the one brake controller position, and a locked position wherein the rod is adapted for locking engagement with one of the wheels when the brake controller is moved toward the other of the brake controller positions. With this arrangement, movement of the collar along the shaft between the first, second and third collar positions selectively adjusts the brake mechanism between the universal, directional and brake states. Additionally, a colored indicator can be used to directly show the current state of the brake mechanism.

According to the improved brake mechanism of the present invention, little strength is needed to step on the pedal for adjusting the brake mechanism between the three states. Thus, adjustment between the states is easy, quick and reliable.

BRIEF DESCRIPTION OF THE DRAWINGS

FIG. 2 is a front schematic view of the present invention in the universal state, with the pedal cover upward;

FIG. 2A is a sectional view of the present invention taken along line 2A—2A of FIG. 2;

DETAILED DESCRIPTION OF THE PREFERRED EMBODIMENTS

Figure 1:
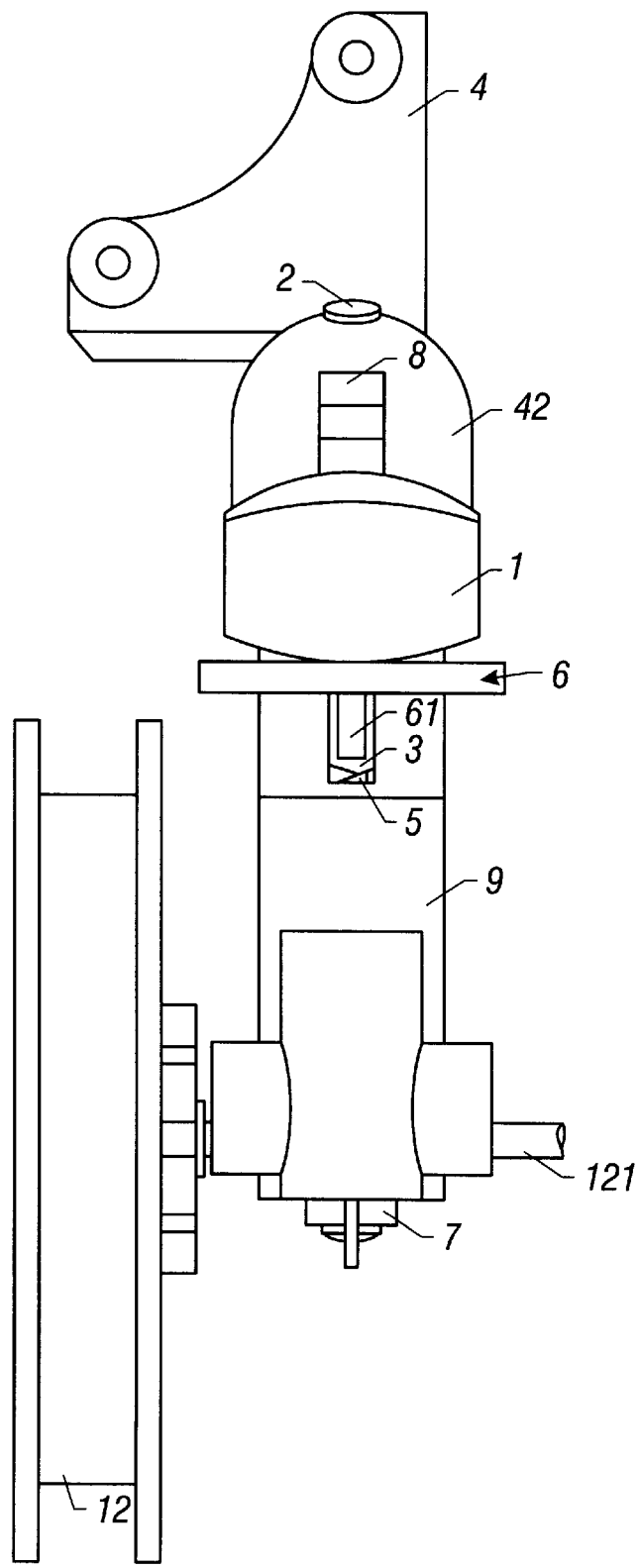
FIG. 1 is an elevated front schematic view of the present invention in the universal state.

In the drawings, FIGS. 1–4 show the relationship between the structural components of the present invention in different states. FIG. 1 shows the present invention in the universal and rotatable state and includes a front-rear wheel joint part 4 and a pedal cover 1 that can rotate around a vertical shaft 2. A hub 12 is mounted for rotation around a wheel shaft 121. The pedal cover 1 rotates downwardly under gravity and contacts the sliding collar 6, which then completely reveals a colored indicator 8. The colored indicator 8 is in the form of a lattice with three different colored portions, which is adhered to or directly printed on a cylinder 42 of the front-rear wheel joint part 4. The three colors are preferably red, yellow and green, from the top to the bottom of the indicator, respectively. The appearance of all three colors is indicative of the wheel being in the universal and rotatable state, wherein the wheel can be swiveled and rotated; the appearance of the two colors red and yellow is indicative that the wheel is in the directional state wherein the wheel can only be rotated; and the appearance of only the red color is indicative of the wheel being locked against swiveling and rotation in the directional-braking state.

Figure 3:
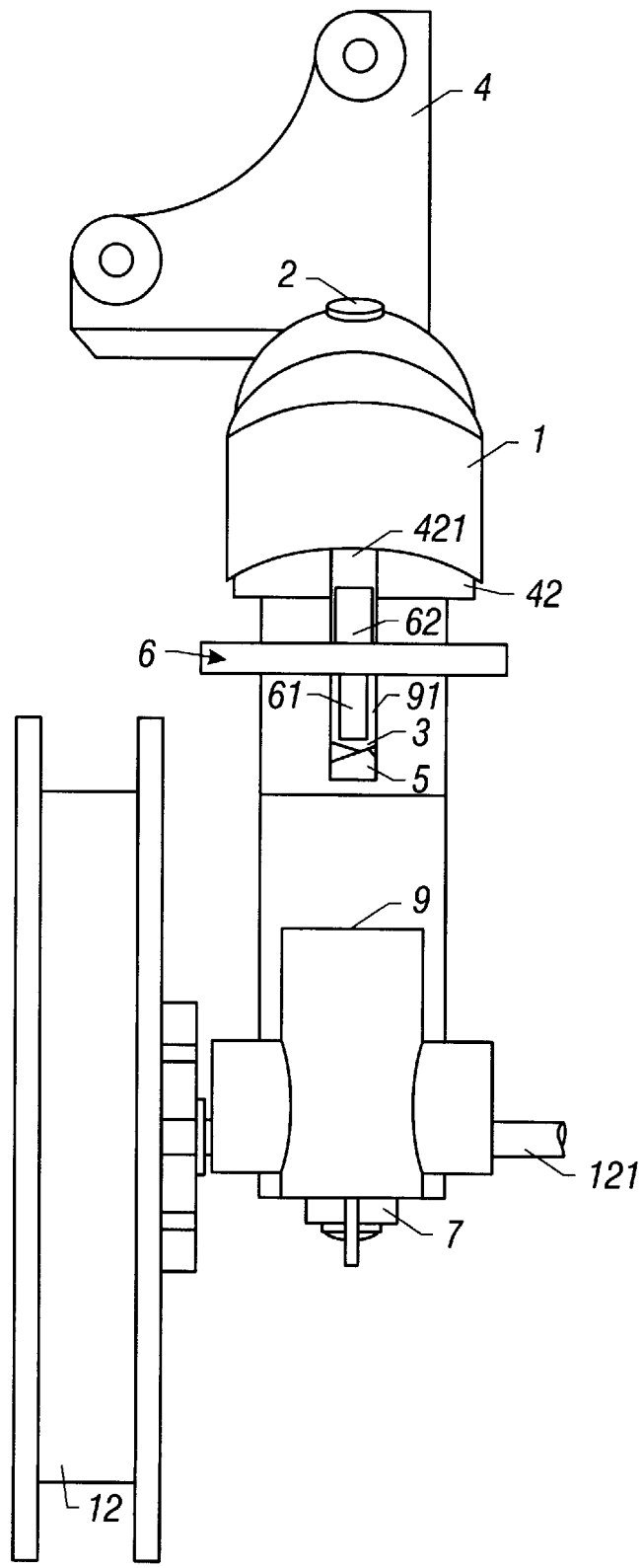
FIG. 3 is a front schematic view of the present invention in the directional state, with the pedal cover upward.
Figure 4:
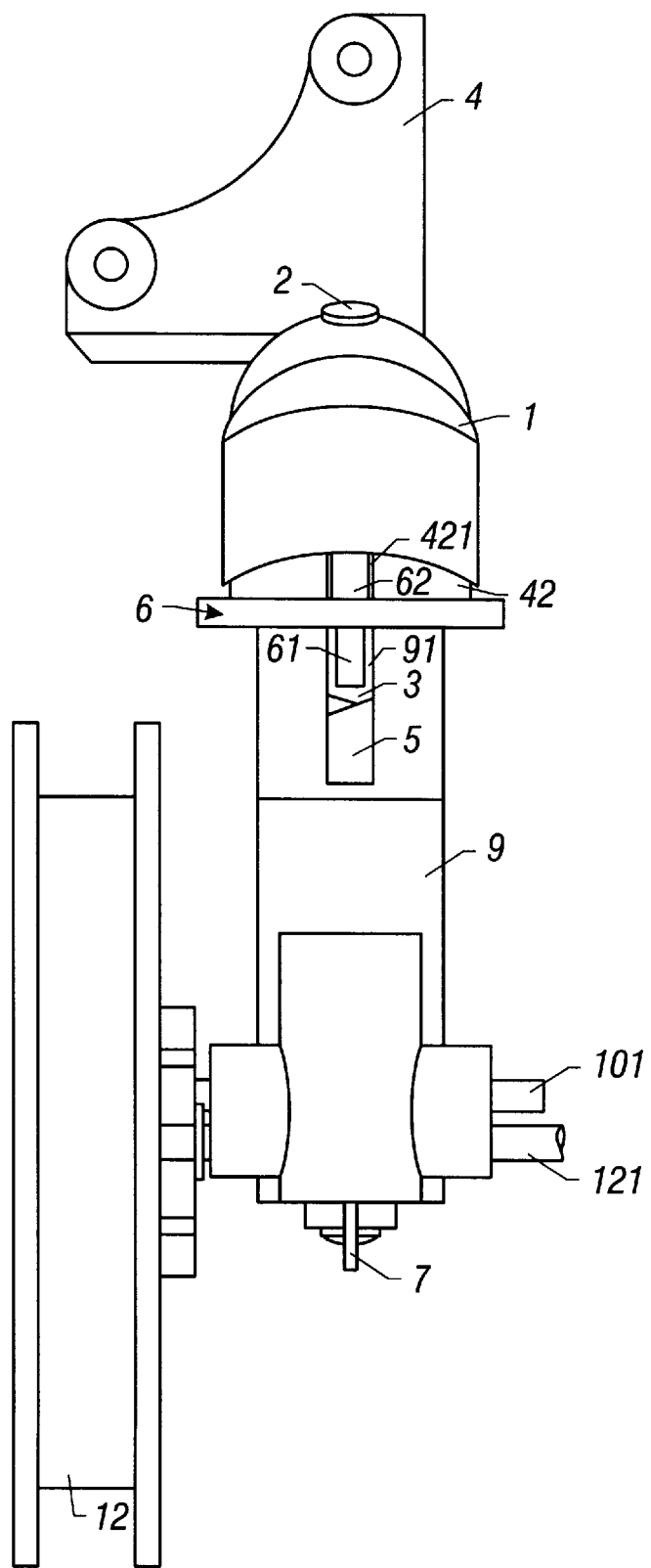
FIG. 4 is a front schematic view of the present invention in the directional-braking state, with the pedal cover upward.

FIGS. 2–4 show the pedal cover 1 positioned upwardly out of its normal downward position so as to clearly illustrate the difference among the three states of the present invention.

Figure 5:
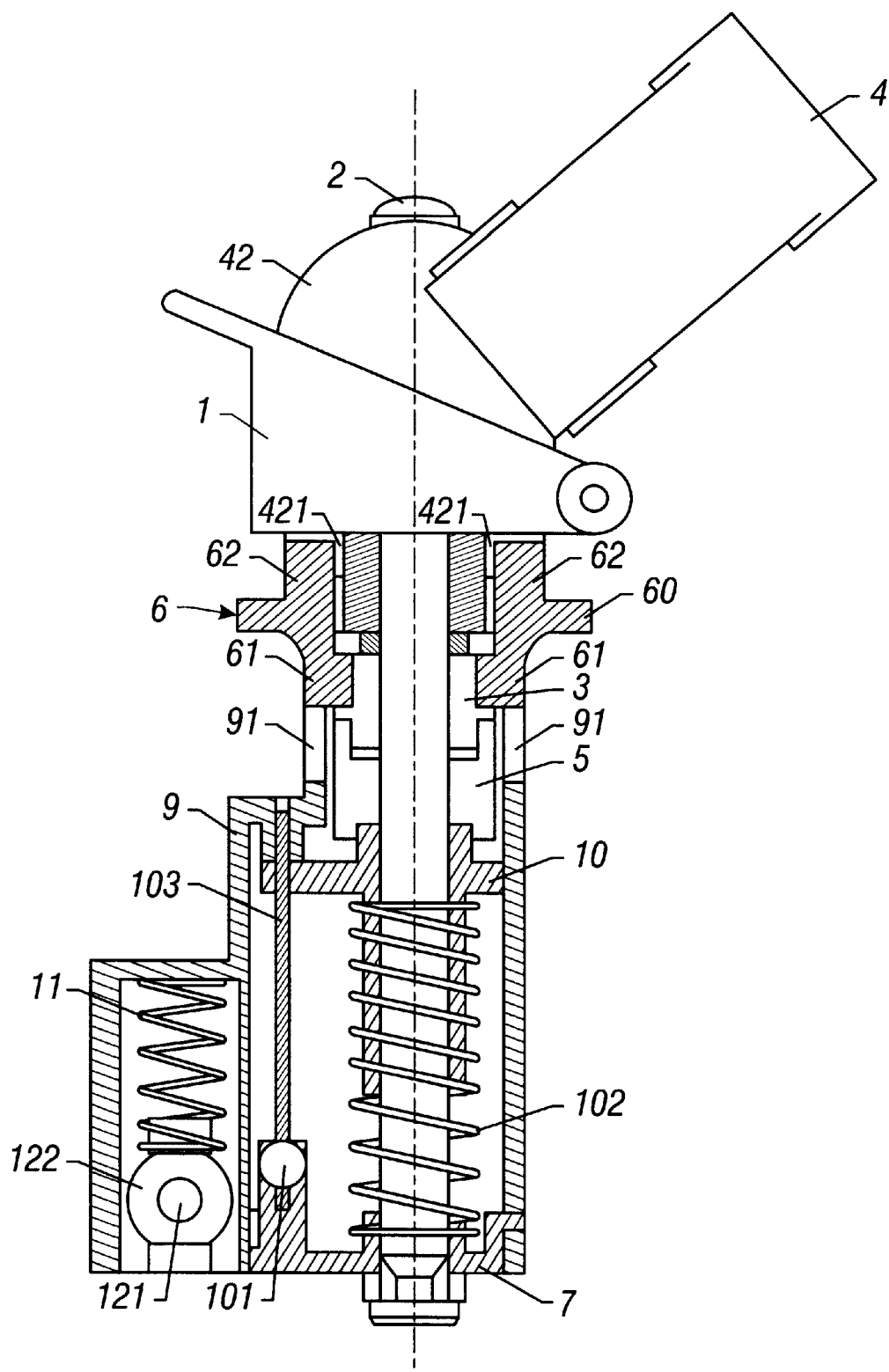
FIG. 5 is a sectional side view of the present invention.

As shown in FIGS. 2 and 8–11, the sliding collar 6 includes a circular convex platform 60 with two upper convex parts 62 mounted diametrically on the platform 60 and projecting upwardly therefrom, and corresponding two lower convex parts 61 mounted diametrically on the platform 60 and projecting downwardly therefrom. Two notches 421 are formed in the front and rear of the cylinder 42 corresponding to the position of the upper convex parts 62. The cylinder 42 is mounted around the outside of a front & rear wheel support 9, and the vertical shaft 2 extends through them. Two grooves or notches 91 are formed on an upper portion of the front & rear wheel support 9 corresponding to the position of the lower convex parts 61. When the present invention is in the universal and rotatable state, the lower convex parts 61 are located at the bottom of the grooves 91 and the upper convex parts 62 are free of the notches 421, such that the front & rear wheel joint part 4 can rotate freely about the vertical shaft 2. As shown in FIG. 5, the lower convex part 61 is fixed together with the upper position fixers 3. Due to the nature of the circular convex platform 60 of the sliding collar 6, there is relative movement between the upper position fixer 3 and a lower position fixer 5 by the force of a user stepping on the pedal cover 1, so that the above-mentioned changes of state will occur, no matter which direction the carriage is in.

As shown in FIG. 3, the wheel is in a directional state, but can be rotated around the wheel shaft 121. In this position, the lower convex part 61 is in the middle of the groove 91 and the upper convex part 62 is partly received in the notch 421 to prevent rotation of the front & rear joint part 4. However, the wheel hub can still rotate around the wheel shaft 121.

As shown in FIG. 4, the wheel is in the directional and braking state where the lower convex part 61 is located at the top of the groove 91 and the upper convex part 62 is completely received within the notch 421. The front & rear wheel joint part 4 is prevented from rotation because a brake rod 101 is forced outwardly and into a rib of the wheel, such that the wheel hub 12 cannot rotate around the wheel shaft 121.

With particular reference now to FIG. 5, which is a sectional side view of the present invention, one side of the pedal cover 1 is riveted on the cylinder 42 of the front & rear wheel joint part 4, which the vertical shaft 2 extends through. The upper position fixer 3, the lower position fixer 5 and the brake controller 10 are in turn mounted around the vertical shaft 2, and the above-mentioned three parts can move along the vertical shaft 2. The circular convex platform 60 of the sliding collar 6 is mounted around the outside of the upper cylinder of the front & rear wheel support 9, and the lower convex part 61 is fixed together with the upper position fixer 3. Under the brake controller 10, a brake spring 102 is mounted around the shaft 2 with one end of brake spring 102 mounted inside the cover 7. The cover 7 is used to seal the lower surface of the front & rear wheel support 9, through which the vertical shaft 2 extends. Both the cover 7 and the front & rear wheel support 9 have a corresponding hole for the brake rod 101 to project through.

Figure 6:
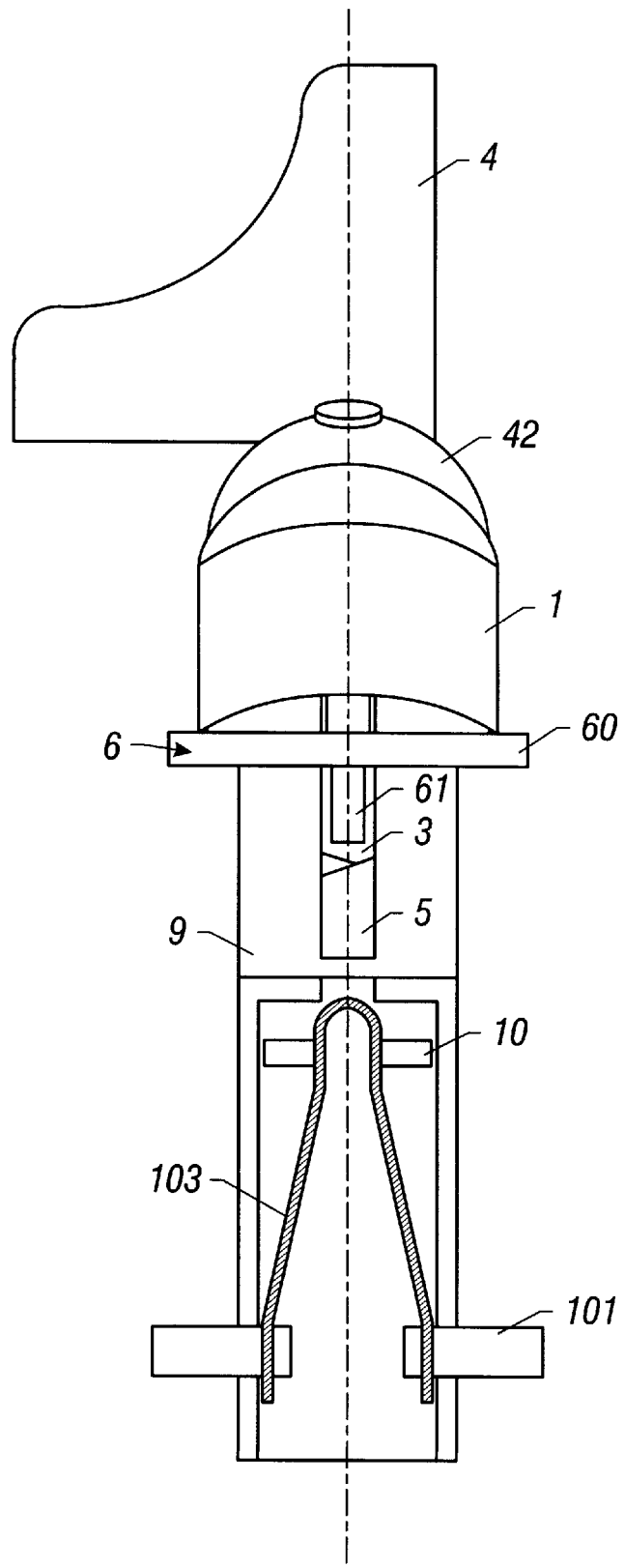
FIG. 6 is a front partial sectional view of the present invention showing the mounting and function of a V-shaped spring of the present invention.

With additional reference to FIG.6, the top end of a V-shaped spring 103 projects through the brake controller 10, while the bottom end projects through the brake rod 101. When the brake controller 10 is pressed downwardly against the V-shaped spring 103, the brake rod 101 is contracted inwardly. When the brake controller 10 is pulled upwardly, the V-shaped spring causes the brake rod 101 to project outwardly.

Figure 7:
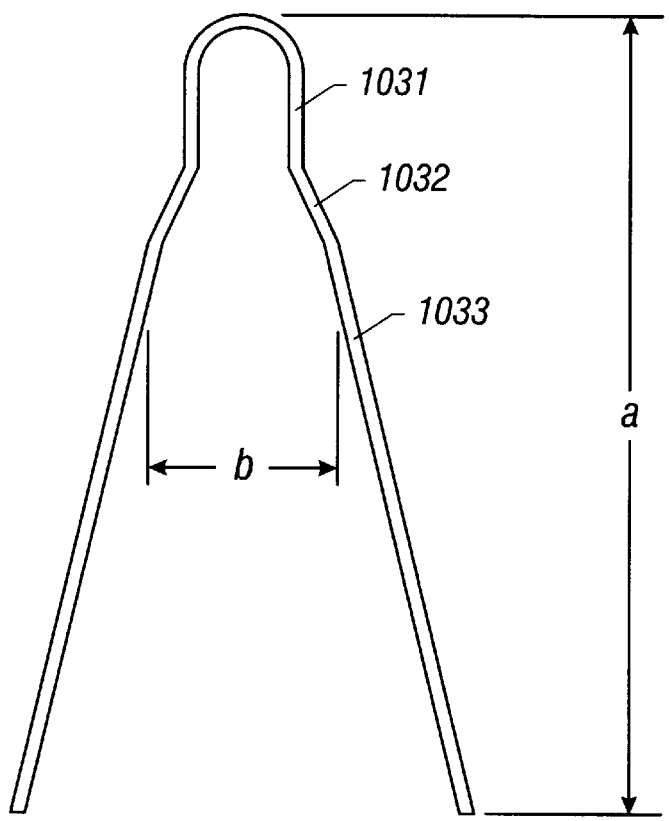
FIG. 7 is a front elevational view of the V-shaped spring of the present invention.
Figure 8:
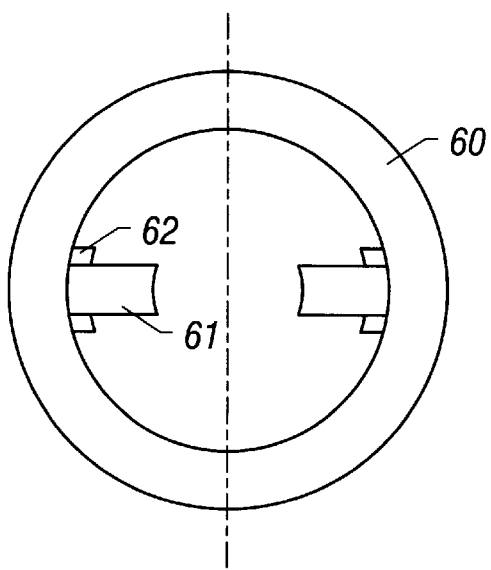
FIG. 8 is a bottom plan view of a sliding collar of the present invention.
Figure 9:
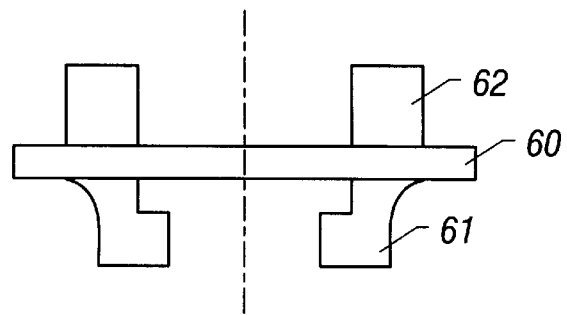
FIG. 9 is a front elevational view of the sliding collar.
Figure 10:
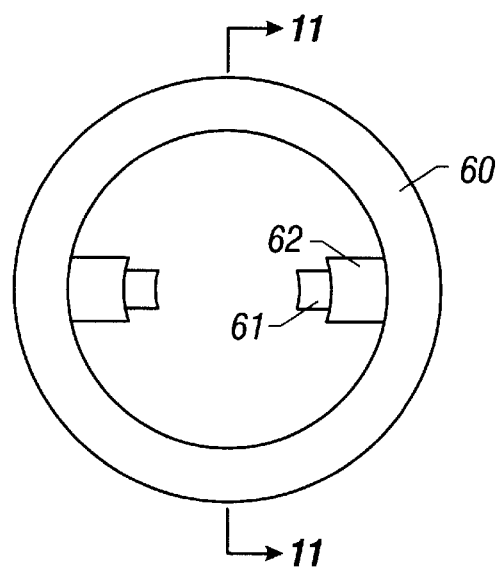
FIG. 10 is a top plan view of the sliding collar.
Figure 11:
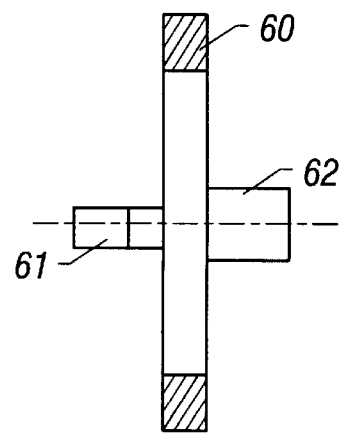
FIG. 11 is a sectional view of the sliding collar taken along line 11—11 of FIG. 10.

FIG. 7 is a front elevational view of the V-shaped spring 103. The V-shaped spring 103 comprises three parts, i.e. a semicircular part 1031, a first V-shaped part 1032 and a second V-shaped part 1033. The width of the opening of the first V-shape part 1032 is represented by b, where b is preferably in the range of approximately 5 to 20 mm. Preferably, b=12 mm. The total height of the V-shaped spring 103 is represented by a, where a is preferably in the range of approximately 33 to 60 mm. Preferably, a=53 mm. Both the value of the total height a and the opening width b are the important factors to ensure that the V-shaped spring works effectively. In this embodiment, while b=12 mm, the brake rod 101 can be bounded or contracted at the right moment, and the proper total height a can prevent the permanent deformation of the V-shaped spring.

Referring again to FIG. 5, the wheel shaft 121 extends into a spherically shaped compression spring base 122. A shock absorbing spring 11 is mounted in a bore of the front & rear wheel support 9, with one end of the shock absorbing spring 11 being compressed on an inner face of the bore, and another end being pressed against the spherically-shaped compression spring base 122 so as to make a more steady and comfortable running carriage.

What is claimed is:

1. An improved brake mechanism for one or more wheels of a baby carriage, stroller, or the like, said brake mechanism comprising:

a mounting member (4) adapted for connection to a carriage, stroller, or the like;

a generally vertically oriented shaft (2) extending through said mounting member and adapted for rotation with respect to said mounting member;

a wheel support member (9) mounted for rotation about said shaft;

at least one wheel (12) rotatable mounted to the wheel support member; and a collar (6) mounted for sliding movement along, said shaft between said mounting member and said wheel support member, said sliding collar being manually movable between first, second and third collar positions, said collar being operably engageable with said mounting member in said first collar position to define a universal state wherein said wheel support member is rotatable about said shaft, said collar being operably engageable and lockable with said mounting member and said wheel support member in said second collar position to define a directional state wherein said wheel support member is fixed with respect to said shaft, and said collar being operably engageable with said wheel in said third collar position to define a brake state wherein said wheel is fixed with respect to said wheel support member;

whereby movement of said collar along said shaft between said first, second and third collar positions selectively adjusts said brake mechanism between said universal, directional and brake states, respectively.

2. The improved brake mechanism according to claim 1 wherein said second collar position is intermediate said first and third collar positions, and further comprising:

a brake controller (10) mounted for slidable movement along said shaft below said collar, said brake controller being biased toward said collar toward a first brake controller position and being operably connected to said collar for movement between said first brake controller position and a second brake controller position as said collar is moved between said first and third collar positions;

a V-shaped spring (103) having a pair of outwardly biased legs connected to a central bight portion, said legs being engageable with said brake controller to force said legs toward each other as said brake controller is moved toward one of said first and second brake controller positions; and a locking rod (101) connected to at least one of said legs and being moveable therewith between an unlocked position when said legs are forced toward each other by movement of said brake controller toward said one brake controller position, and a locked position wherein the rod is adapted for locking engagement with the at least one wheel when said brake controller is moved toward the other of said brake controller positions.

3. The improved brake mechanism according to claim 1 wherein said sliding collar (6) comprises a circular convex platform (60) with two diametrically opposed upper convex parts (62) extending upwardly from said platform and two diametrically opposed lower convex parts (61) extending downwardly from said platform; and further comprising corresponding slots in said mounting member for receiving said upper convex parts, and corresponding slots in said wheel support member (9) for receiving said lower convex parts.

4. The improved brake mechanism according to claim 1 and further comprising a colored indicator attached to said mounting member (4) to indicate the state of said mechanism.

5. The improved brake mechanism according to claim 1 and further comprising a shock absorbing device for the at least one wheel, said shock absorbing device including a spring (11) located in the wheel support member (9) and adapted for engagement with a shaft of the wheel.

6. The improved brake mechanism according to claim 2, wherein said V-shaped spring (103) comprises a semicircular part (1031), a first V-shaped part (1032), and a second V-shaped part (1033); wherein the opening width of the first V-shaped part (1032) is in the range of approximately 5 to 20 mm; and the total height of said V-shaped spring (103) is in the range of approximately 33 to 60 mm.

7. The improved brake mechanism according to claim 4, and further comprising a pedal cover (1) rotatably connected to said mounting member (4), said pedal cover being adapted to selectively expose portions of said colored indicator to indicate the state of said mechanism.

* * * * *

UNITED STATES PATENT AND TRADEMARK OFFICE
CERTIFICATE OF CORRECTION

PATENT NO.: 6,062,577

DATED: May 16, 2000

INVENTOR: Stephen K. Tan

It is certified that error appears in the above-identified patent and that said Letters Patent are hereby corrected as shown below:

Column 4, line 51 (Claim 1, line 1), after "more" insert -- swivelable and rotatable --;
Column 4, line 52 (Claim 1, line 2), delete "of a baby carriage, stroller, or the like";
Column 4, line 55 (Claim 1, line 5), delete "carriage, stroller, or the like" and insert therefor -- structure --;
Column 4, line 63 (Claim 1, line 13), delete the comma after "along".

Signed and Sealed this

Tenth Day of April, 2001

*Attest:*

NICHOLAS P. GODICI

*Attesting Officer*   Acting Director of the United States Patent and Trademark Office